United States Patent
Wright

(10) Patent No.: US 7,024,779 B1
(45) Date of Patent: Apr. 11, 2006

(54) POWER SAW

(75) Inventor: Stuart Wright, Timonium, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/465,946

(22) Filed: Dec. 17, 1999

(30) Foreign Application Priority Data

Dec. 18, 1998 (GB) .................................. 9827940

(51) Int. Cl.
*B23D 51/02* (2006.01)

(52) U.S. Cl. .............................. 30/371; 30/375; 30/376

(58) Field of Classification Search ................. 30/371, 30/375, 376, 392, 393, 394, 286
See application file for complete search history.

(56) References Cited

U.S. PATENT DOCUMENTS

| 604,896 | A | | 5/1898 | Garnett |
| 1,035,524 | A | * | 8/1912 | Bradley ........................ 30/376 |
| 2,016,153 | A | | 10/1935 | McWhirter |
| 2,379,984 | A | | 7/1945 | Nereaux |
| 2,722,244 | A | | 11/1955 | Schultz |
| 2,998,830 | A | * | 9/1961 | Atkinson ...................... 30/371 |
| 3,703,036 | A | | 11/1972 | Karubian |
| 3,750,283 | A | | 8/1973 | Hoffman |
| 3,823,473 | A | | 7/1974 | Hoffman |
| 3,942,249 | A | | 3/1976 | Poehlmann |
| 4,035,097 | A | | 7/1977 | Bachand |
| 4,083,112 | A | | 4/1978 | Palm |
| 4,105,347 | A | | 8/1978 | Gossage |
| 4,170,061 | A | | 10/1979 | Henry |
| 4,272,887 | A | | 6/1981 | Poehlmann |
| 4,285,129 | A | | 8/1981 | Hoffman |
| 4,541,175 | A | | 9/1985 | Boyd et al. |
| 4,594,781 | A | | 6/1986 | Hoffman |
| 4,648,182 | A | | 3/1987 | Hoffman |
| 4,670,984 | A | | 6/1987 | Rickard |
| 4,750,267 | A | | 6/1988 | Boyd |
| 4,837,935 | A | | 6/1989 | Maier et al. |
| 5,092,045 | A | | 3/1992 | Boyd, Jr. et al. |
| 5,134,777 | A | * | 8/1992 | Meyer et al. .................. 30/392 |
| 5,193,281 | A | * | 3/1993 | Kasten ......................... 30/394 |
| 5,306,025 | A | | 4/1994 | Langhoff |
| 5,324,052 | A | | 6/1994 | Ortmann |
| 5,421,091 | A | * | 6/1995 | Gerritsen, Jr. ................ 30/377 |
| 5,458,346 | A | | 10/1995 | Briggs |
| 5,575,071 | A | | 11/1996 | Phillips et al. |
| 5,644,845 | A | | 7/1997 | Dürr et al. |
| 5,724,741 | A | * | 3/1998 | Bednar ......................... 30/376 |
| 5,755,293 | A | * | 5/1998 | Bourke ....................... 144/48.6 |
| 5,782,000 | A | * | 7/1998 | Bednar ......................... 30/393 |
| 5,800,022 | A | | 9/1998 | Del Rosario |
| 5,801,367 | A | | 9/1998 | Asplund et al. |
| 5,832,611 | A | * | 11/1998 | Schmitz ........................ 30/392 |
| 5,855,070 | A | * | 1/1999 | Grabowski .................... 30/376 |
| 5,940,977 | A | * | 8/1999 | Moores, Jr. ................... 30/392 |

FOREIGN PATENT DOCUMENTS

EP  0716898  6/1996
EP  0811450  12/1997

* cited by examiner

*Primary Examiner*—Rinaldi L. Rada

(57) ABSTRACT

A power saw includes a body (36) housing a motor (24). The motor drives a reciprocal shaft (2) on which a blade (12) is mounted. The body is coupled to a pivotable sole plate (48,50) which is held relative to the body (36) in a plurality of positions such that in at least one position the sole plate may act as a guide for use of the tool as a jigsaw.

9 Claims, 10 Drawing Sheets

POWER SAW

The present invention relates to a power saw and has particular, although not exclusive, relevance to such a power saw which may be operated with a plurality of interchangeable saw blades.

Although the concept of using a power saw with a plurality of interchangeable blades has been known for many years, there is a tendency for the blades which are interchanged to be of the same physical size. The only significant difference between the blades tends to be the nature of the saw teeth. For example teeth of differing pitches are used when sawing wood as opposed to metal.

It has, however, been found that it would be useful if a power saw could accept a plurality of different saw blades of differing sizes as well as of differing natures. Such a provision could enable the power saw to operate in totally different sawing modes, depending upon which blades are used.

For example, if the power saw were able to accept a large woodsawing blade (such as are used for cutting tree branches or wooden logs) and also a small jigsaw blade, then a truly versatile saw would be available. The saw could then be readily adapted to different sawing modes by the user simply changing the blades.

Although the above aim is highly desirable, there exist certain difficulties. For example, a large power saw (so-called "panel saw") has fundamentally different characteristics to those of a jigsaw.

Panel saws tend to be large, heavy and bulky saws having high-powered motors. This is because in use of the saw, a large workpiece and a high amount of stock are worked upon. Also, a high degree of accuracy in the sawing process tends not to be necessary.

By contrast jigsaws tend to be relatively small, light-weight saws with smaller, often variable-speed, motors. Because the workpiece on which a jigsaw is used is usually small and/or thin, then smaller saw blades are used. Furthermore there is often the need for a high degree of accuracy when sawing with a jigsaw.

Additionally, the panel saw and jigsaw blades are usually held at different angles relative to a workpiece. A panel saw blade is often brought down into contact with a workpiece generally parallel therewith, whilst a jigsaw blade cuts into a workpiece from the side.

The above differences mean that a jigsaw will need to have a sole plate in order to guide the saw blade during cutting and also to enable the user of the jigsaw to maintain the attitude of the blade constant with respect to the workpiece. A panel saw, however, often needs no such sole plate.

It would thus be highly desirable for a saw capable of operating in a plurality of modes, such as a panel saw and a jigsaw, to have a sole plate when needed, but no sole plate when not needed.

Accordingly the present invention provides a body and a motor housed within the body; the motor arranged to power a reciprocable shaft on which a blade for sawing may be mounted; a pivotable sole plate attached to the body and arranged to be held relative thereto in a plurality of positions such that in at least one position the sole plate acts as a guide for use of the power saw as a jigsaw with the blade for sawing passing through the sole plate in use of the power saw as a jigsaw. By allowing the sole plate to be pivotable into and out of a plurality of positions, then the above desirable advantages may be met.

Preferably the body of the power saw defines two working surfaces either of which may, during use of the power saw, abut a workpiece, and wherein the pivotable sole plate may be pivoted to rest against either of these two surfaces. If one of the working surfaces is used when the saw is in a panel saw mode, then the sole plate may abut the other during use. Conversely, if the other working surface is used when the saw is in a jigsaw mode, the sole plate may abut the said one working surface. The pivotable sole plate may be lockable in any one of the plurality of positions.

In a preferred embodiment the body is shaped to define a recess within which the pivotable sole plate may sit when in at least one of the plurality of positions. This permits the sole plate to be kept out of the way of the user when desired during certain sawing operations. Also, the sole plate may include visual indicia to act as a guide to align the power saw with a workpiece.

The present invention will now be described, by way of example only, and with reference to the accompanying drawings, of which:—

Figure 1:
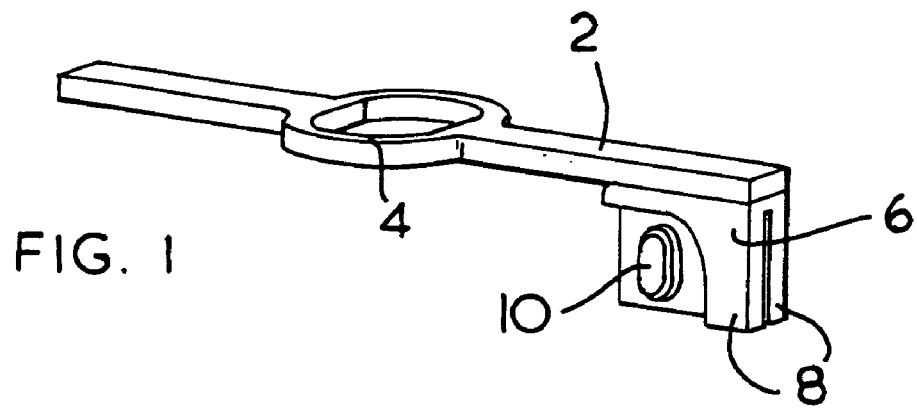
FIG. 1 shows a reciprocable shaft on which a saw blade may be mounted in accordance with an embodiment of the present invention.

Referring firstly to FIG. 1, there is shown a shaft (2) formed from pressed metal, such as steel, and having in the centre thereof a yoke (4). One end of the shaft (2) is formed integrally with a depending retaining member, here a blade mount (6). The blade mount (6) comprises a restraining means, here two arms (8) which depend from the shaft (2). The blade mount further includes a pin (10) which will be described in more detail below.

Figure 2:
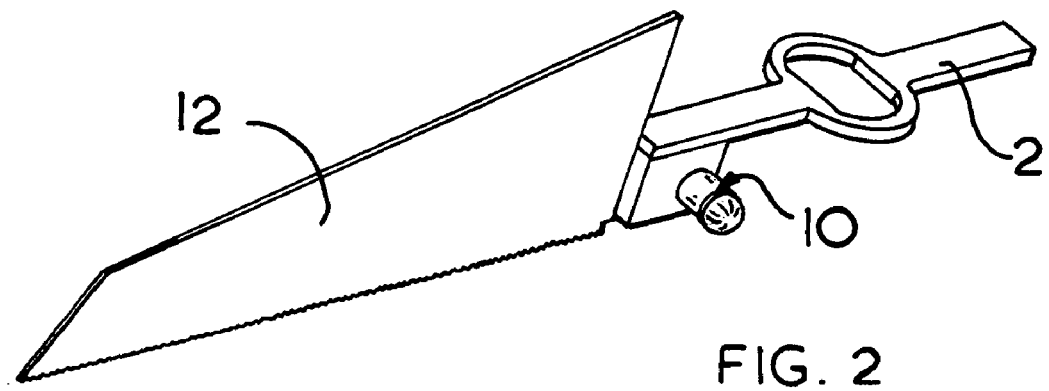
FIG. 2 shows the shaft of FIG. 1, but with a saw blade mounted thereon in an operating position from one side.
Figure 3:
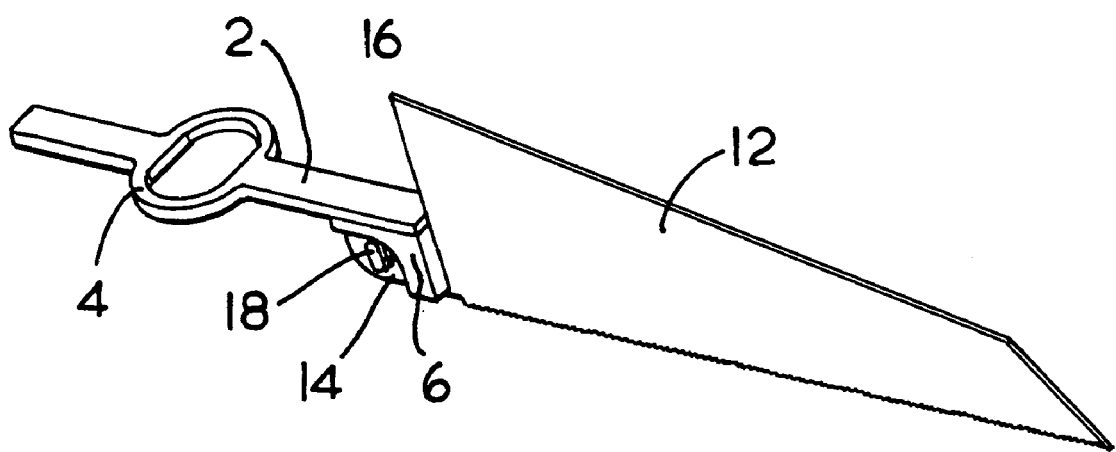
FIG. 3 shows the view of FIG. 2, but from the other side of the saw blade.

Referring now also to FIGS. 2 and 3, it can be seen that the shaft (2) is arranged to drive a saw blade (12) presented thereto and which is mounted on the blade mount (6). It can be seen that the saw blade (12) has a shank (14) which has formed therein a hole (16) (see more clearly FIGS. 5, 8 and 9) for mounting the blade (12) on a lug (18) of the pin (10).

Figure 4:
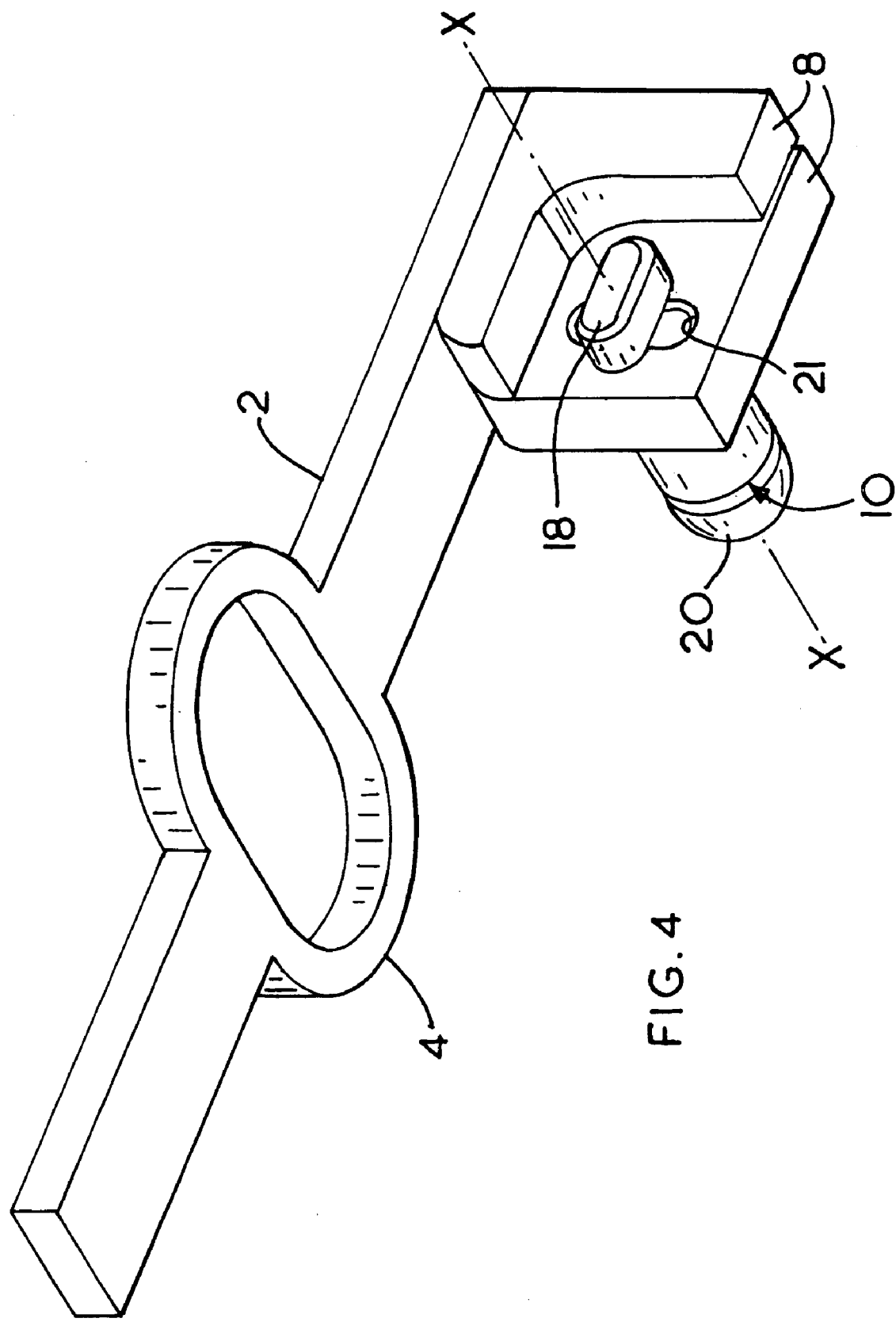
FIG. 4 shows a side view of the reciprocable shaft of FIG. 1, but with the retaining member thereof being in an unlocked position.

Referring now to FIG. 4, it can be seen that the pin (10) comprises a head (20) formed on one side of the blade mount (6) and a lug (18) co-operating with the head (20) formed on the other side of the blade mount (6). The shape of the lug (18) is the same as that of the hole (16) formed in the blade (12). This allows for the blade (12) to be mounted snugly on the lug (18).

The pin (10) is rotatable about its axis shown as X—X in FIG. 4 and it can be seen from this figure that the blade mount (6) has a recess (21) formed therein such that the lug (18) may sit within the recess (21) when it is in one of two positions. Because the pin (10) is rotatable about the axis X—X, then whenever the lug (18) is aligned with the recess (21) (in either of two positions 180° apart) then it will fit within the recess (21). In any other position, the lug (18) cannot sit within the recess (21).

In order for the lug (18) to be selectively aligned or not with the recess (21), the head (20) of the pin (10) is spring biased. In this manner, therefore, whenever the lug (18) is aligned with the recess (21) it "pops" into the recess and is held therein until the user exerts sufficient force against the head (20) against the action of the spring (described later below) to force the lug (18) out of the recess (21) and therefore allow the pin (10) to be rotated about the axis X—X.

Figure 5:
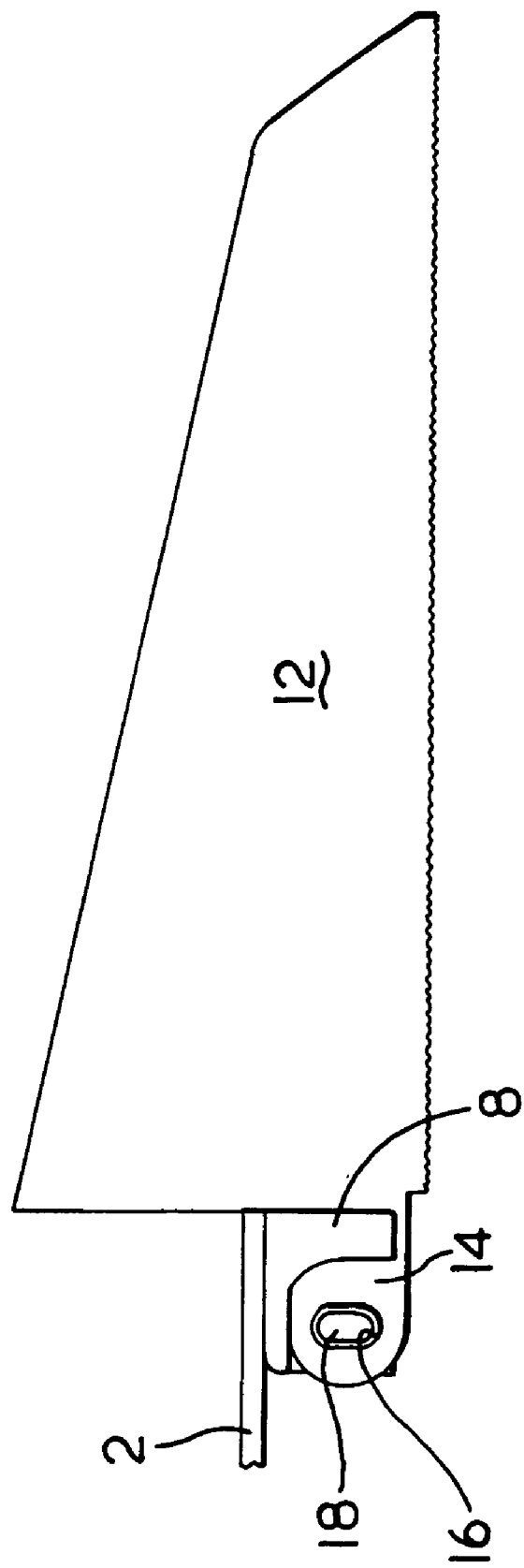
FIG. 5 shows the shaft of FIG. 1 with the saw blade mounted thereon in a locked position.

Referring now additionally to FIG. 5, it can be seen that the saw blade (12) is held in its locked position (because the lug (18) is within the recess (21)) against the shaft (2). Because the shaft (2) is arranged to reciprocate, that is drive the blade (12) backwards and forwards along a linear path, then it will be understood that each of the arms (8) is arranged to flank the shank (14) of the blade (12) to prevent the blade (12) from becoming detached from the blade mount (6). This is because the arms (8) prevent any movement of the blade (12) in a direction perpendicular to the direction of reciprocation of the shaft (2).

In order to understand the operation of the pin (10) and its interaction with the blade (12), reference will now be made in particular to FIGS. 5, 6 and 7.

Figure 6:
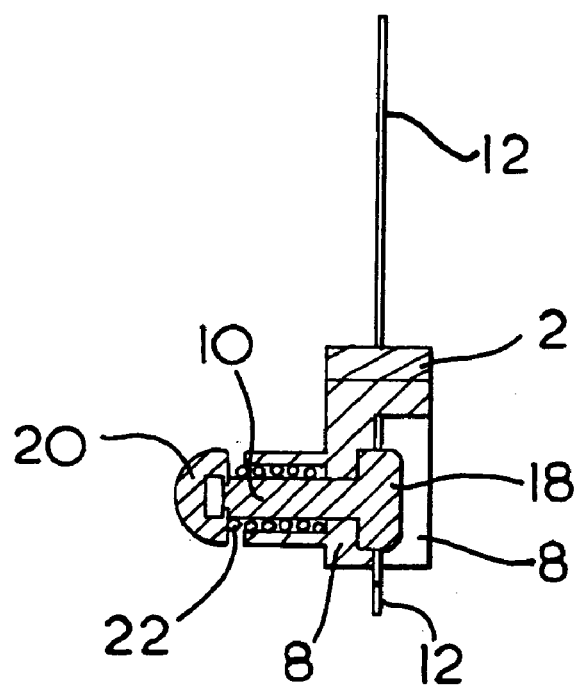
FIG. 6 shows a sectional view along the line A—A of FIG. 5.

The pin (10) is spring biased, and in the case of FIG. 6, it can be seen that the head (20) of the pin (10) has not been depressed and therefore under the action of the spring (22), the head (20) is forced to the left of FIG. 6 therefore allowing the lug (18) to sit within the recess (21). This does, of course, presuppose that the lug (18) is aligned with the recess (21) as has been described here above. Assuming this to be the case, then the blade will be locked in this position. Rotation of the pin and therefore the lug (18) are not possible because the lug (18) is located within the housing (20).

Figure 7:
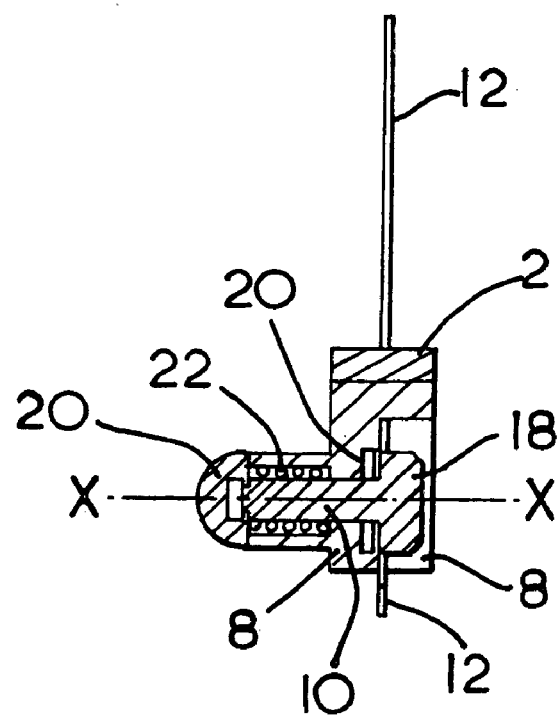
FIG. 7 shows a sectional view along the line B—B of FIG. 5.

Referring now to FIG. 7, it will be described how the lug (18) is released from the recess (21) in order to allow rotation of the saw blade (12).

Figure 8:
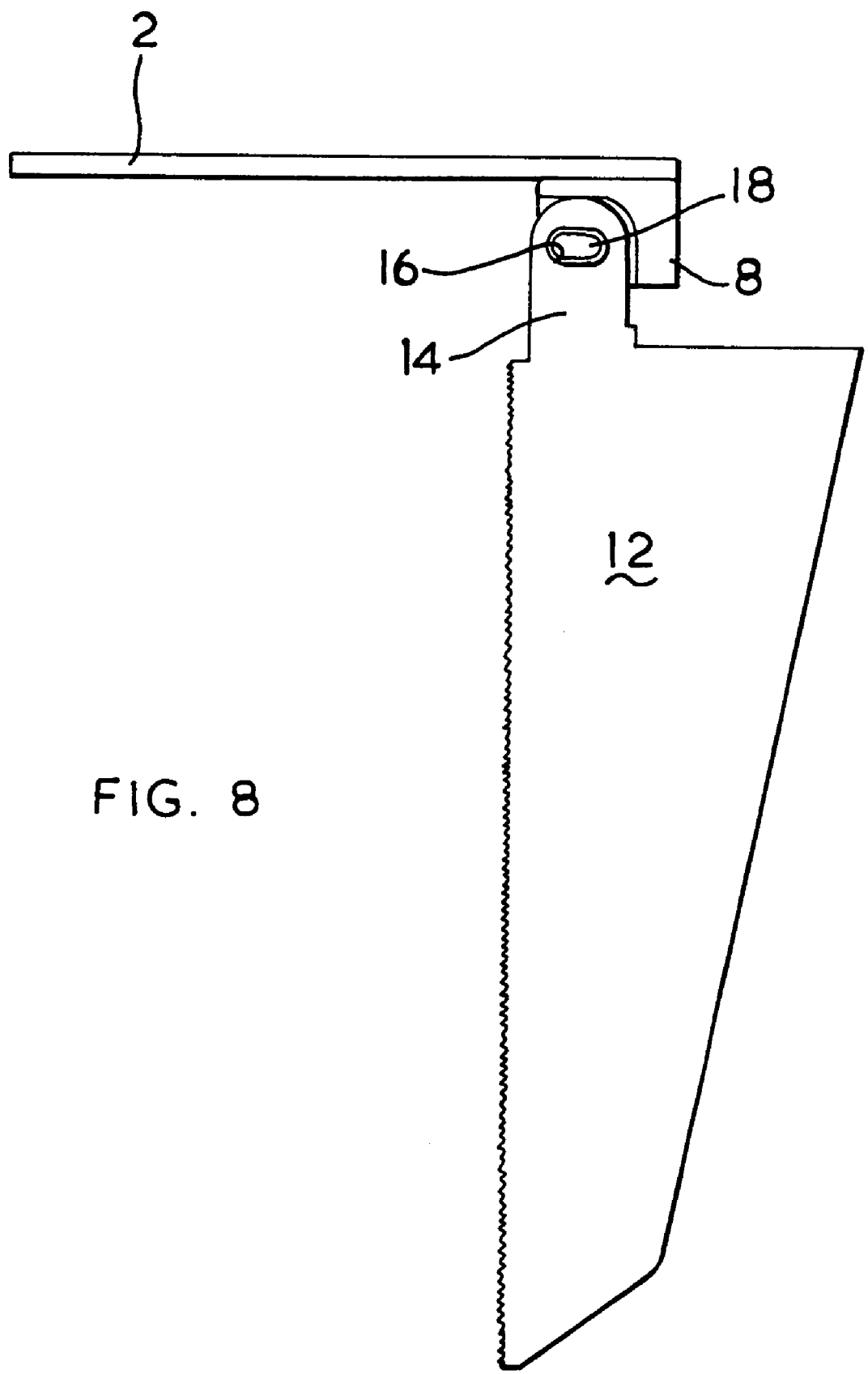
FIG. 8 shows a side view of a saw blade and the reciprocable shaft of FIGS. 2 and 3 in an unlocked position.

In FIG. 7 the user has pushed the head (20) to the right of the figure and therefore caused compression of the spring (22). The movement of the pin (10) to the right of the figure releases the lug (18) from the recess (21) and therefore allows rotation of the pin (10) about its axis X—X. Because the lug (18) is now no longer located within the recess (21) then rotation of the pin (10) means that the blade (12) may be rotated as well. Referring also to FIG. 8, this shows how the saw blade (12) has been rotated through 90° as compared with the locked position of FIG. 5.

Whilst referring to FIG. 8, it can be seen that, because the blade (12) is now perpendicular to the shaft (2) rather than parallel therewith as was the case in FIG. 5, then the shank (14) of the saw blade (12) is no longer constrained by the arms (8) of the blade mount (6). This means that the entire blade (12) may be removed from the lug (18) and could, for example, be replaced by an alternative saw blade.

Figure 9:
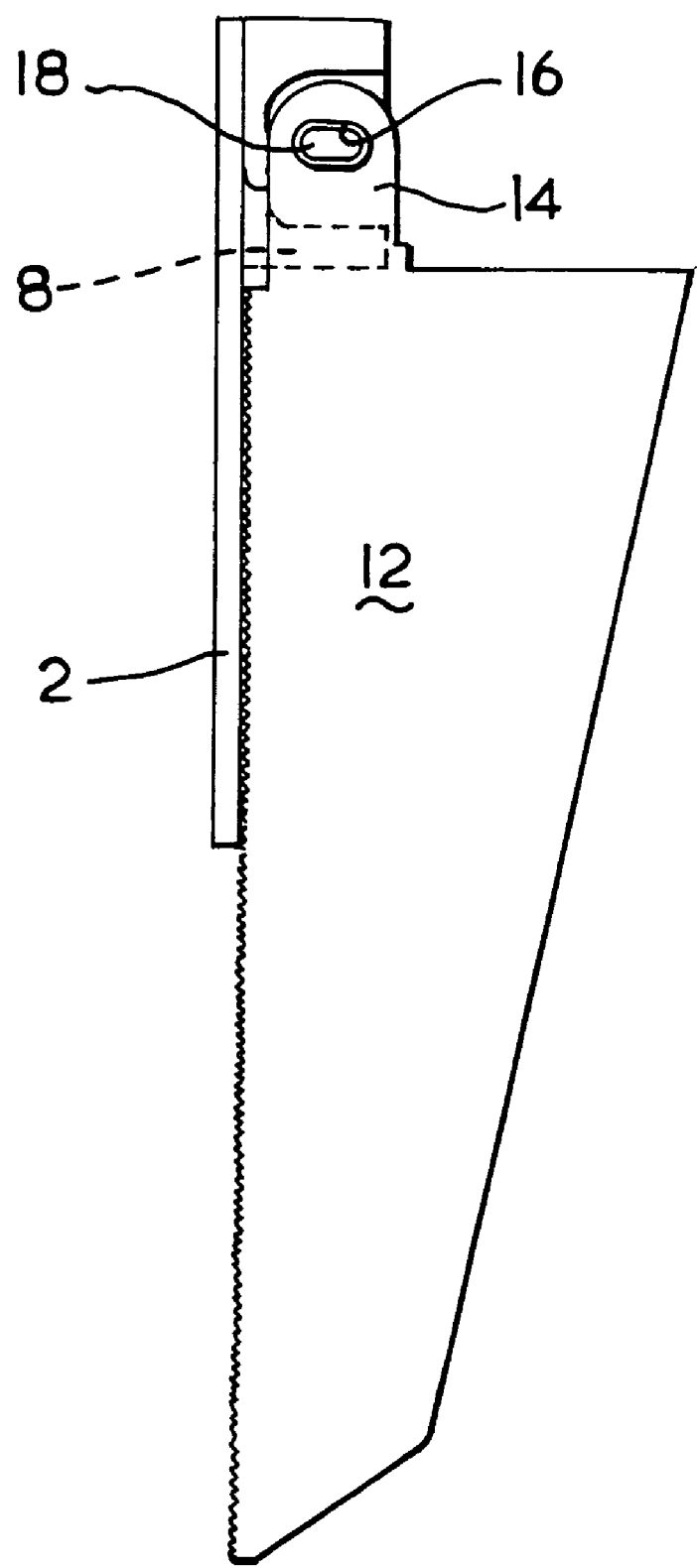
FIG. 9 shows the view of FIG. 8, but with the saw blade now retained in its stored and locked position.

Referring now to FIG. 9, it can be seen that further rotation of the pin (10) and the blade (12) is possible (because there is no alignment between the lug (18) and the recess (20)). The saw blade (12) as shown in FIG. 9 has now been rotated through 180° with respect to that of FIG. 5. It will be appreciated that the lug (18) is now re-aligned with the recess (21) and therefore if the user ceases to apply any force to the head (20) of the pin (10), then the lug (18) may fall back into the recess (21) and therefore lock the saw blade (12) in the position shown. This may be useful when the saw is to be carried around but the blade needs to be kept safely within the body of the saw, for example, to avoid injuring a user or damage to the saw blade.

Although only shown in dotted outline in FIG. 9, it will understood that a further pair of arms (8) may be employed in the blade mount (6) to retain the saw blade (12) in the position shown.

Figure 10:
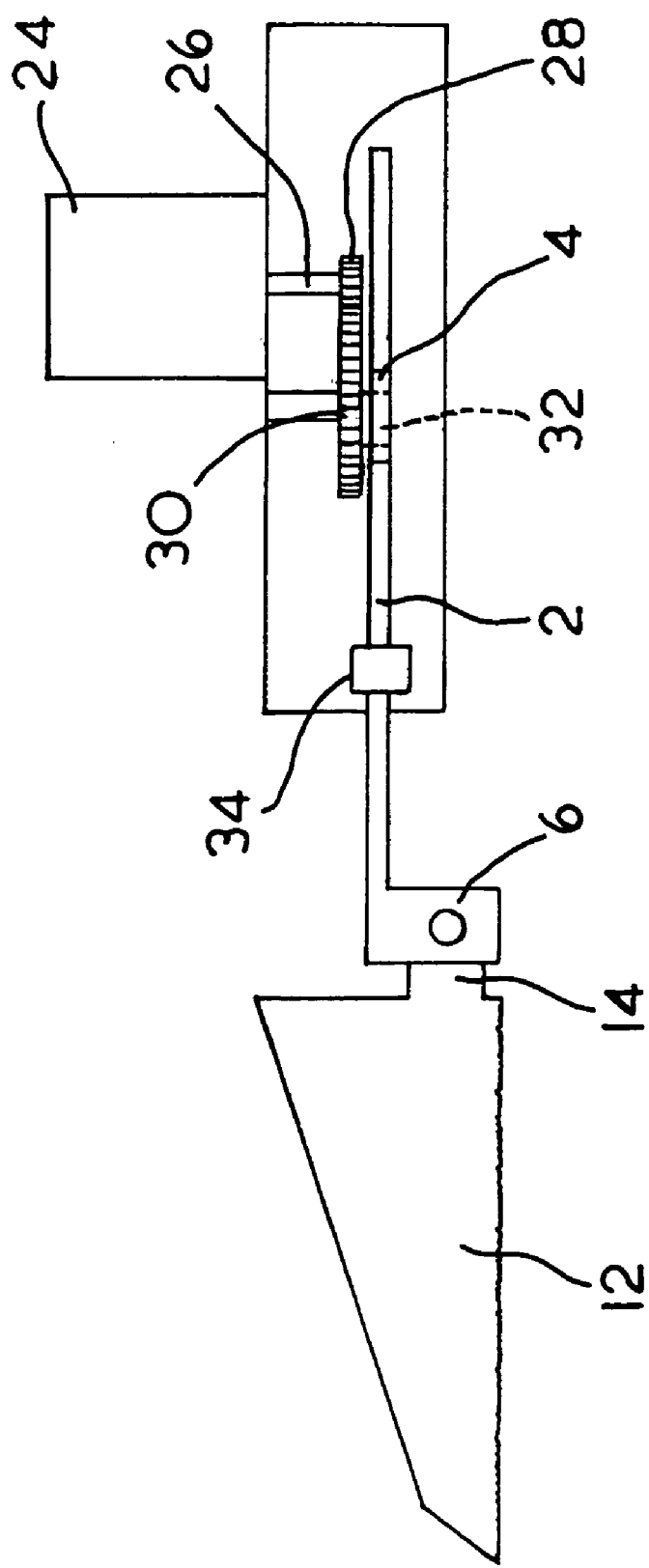
FIG. 10 shows a schematic illustration of the motor and internal mechanisms of a power tool in accordance with an embodiment of the present invention.
Figure 11:
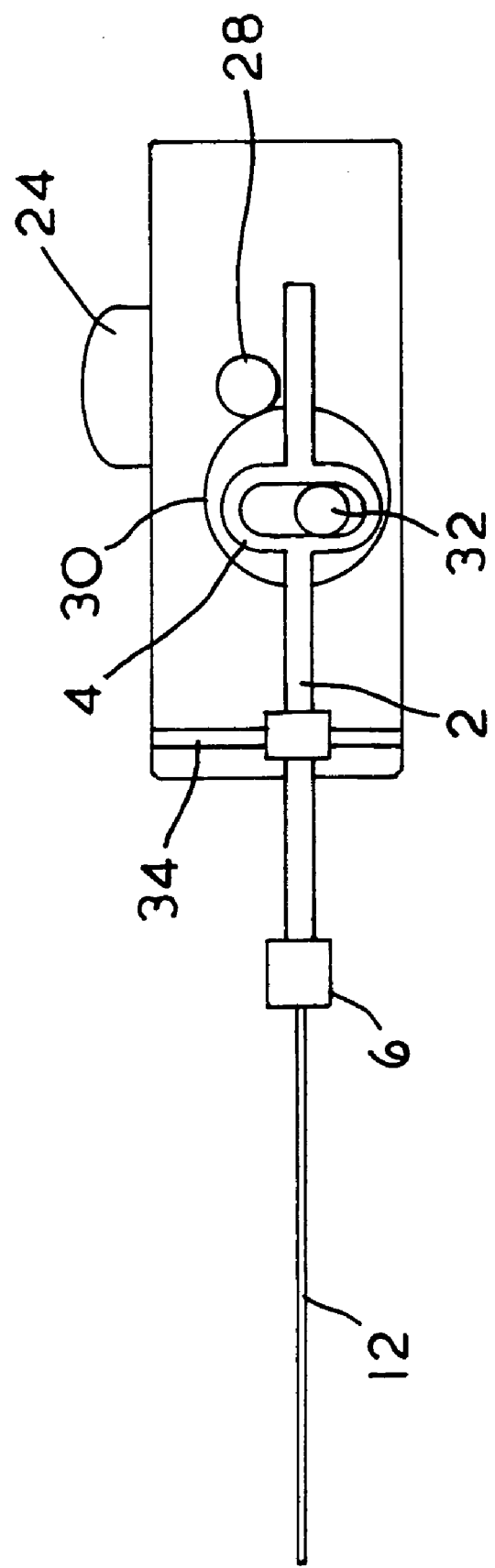
FIG. 11 shows a schematic side representation of FIG. 10.

Referring now to FIGS. 10 and 11 particularly, the internal mechanism of the power tool embodying the present invention will be described. In these examples, the power tool is a power saw.

An electric motor (24) is operable in conventional manner to drive a motor spindle (26) coupled to a drive wheel (28). The teeth of the drive wheel (28) mesh with the teeth of a gear wheel (30) having formed thereon an eccentric (32). Although not shown in the drawings, the eccentric (32) must be counter-balanced and those skilled in the art will appreciate this fact.

The eccentric (32) fits into the yoke (4). In this way, when the motor (24) is activated, it drives the drive wheel (28) which in turn causes rotation of the gear wheel (30). The circular movement of the eccentric (32) sitting in the yoke (4) therefore causes a linear reciprocal motion of the shaft (2) in a right-left-right motion as the drawings are viewed. In order to ensure that the only motion of the shaft (2) at the operative end (that is where the blade (12) and the blade mount (6) are situated) occurs, a retaining bar (34) having linear bearings surrounds the shaft (2). This restrains movement of the shaft only in the left-right-left linear direction.

Whilst in the above examples of FIGS. 10 and 11 only one drive wheel (28) is shown, those skilled in the art will appreciate that any desired gearing arrangement may be used. The choice of gearing arrangement will depend primarily on the step up/step down requirement between the rotational output speed of the motor (24) and the frequency of linear reciprocation needed for the shaft (2).

Figure 12:
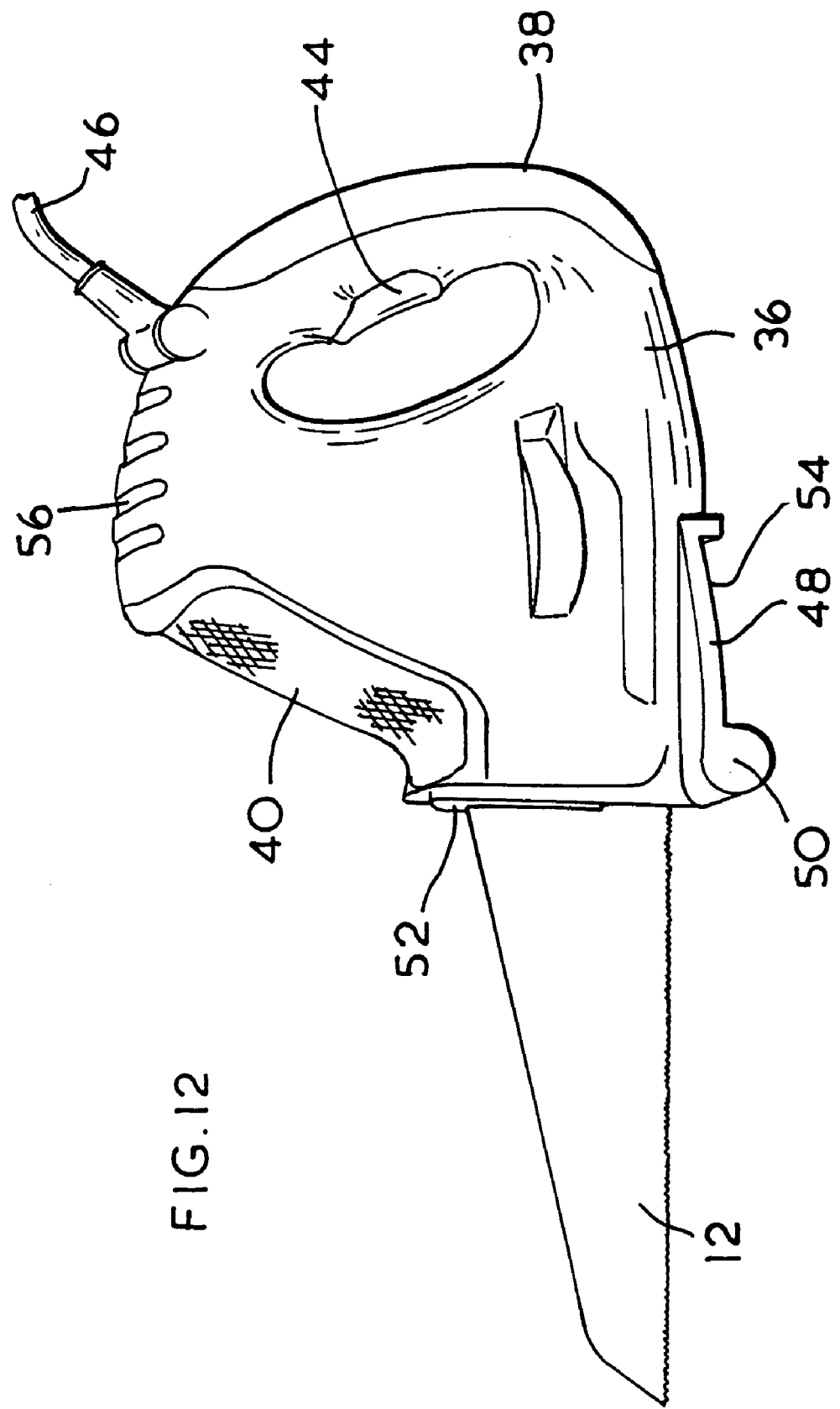
FIG. 12 shows a side view of a powered saw in accordance with an embodiment of the present invention.
Figure 13:
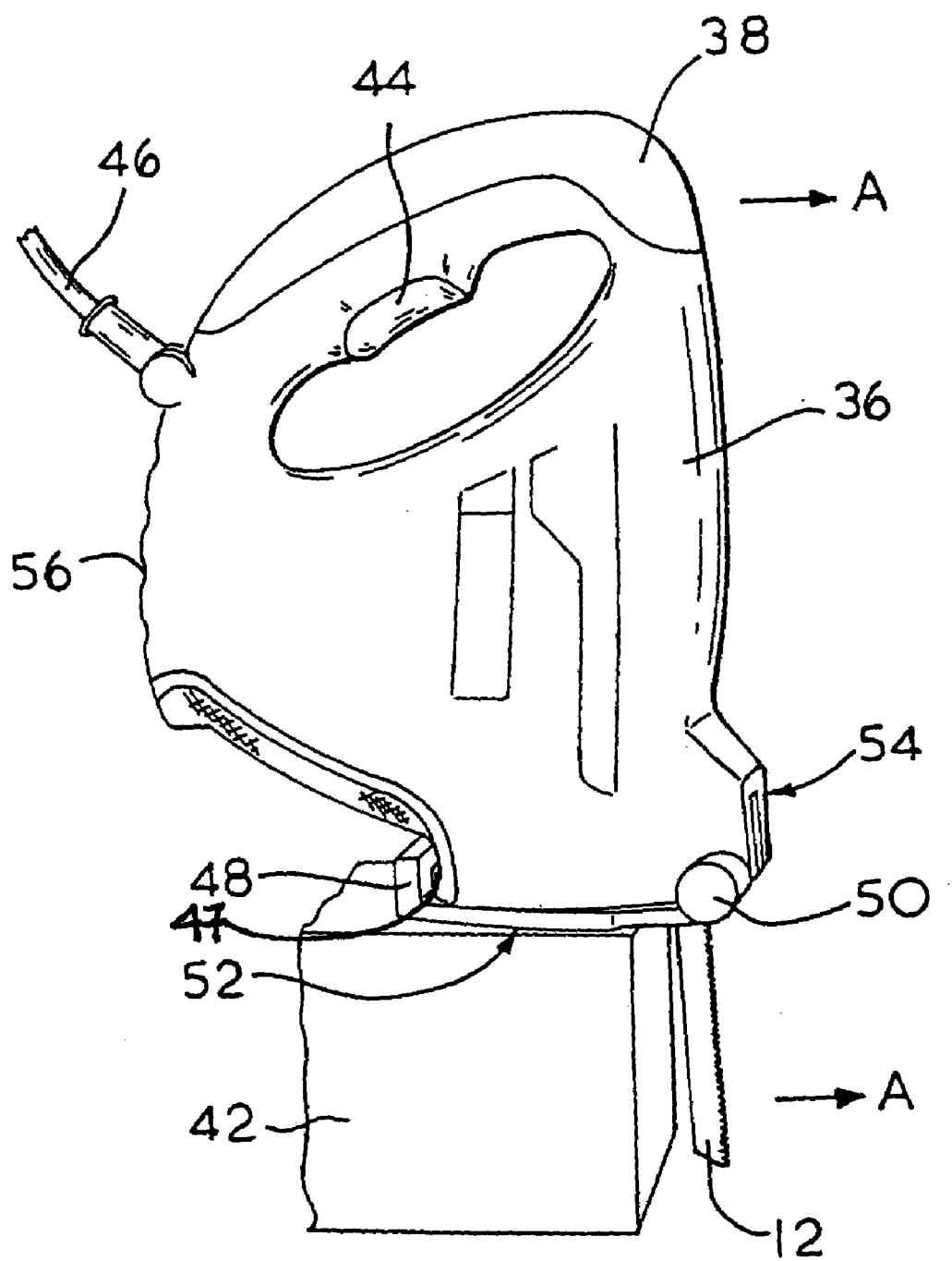
FIG. 13 shows a side view of an alternative use of a powered saw to that of FIG. 12.

Referring now particularly to FIGS. 12 and 13, two further embodiments of the present invention are now described. It can be seen by comparing these two figures, that the power tools shown therein share the same body (36). However, the tools shown in FIGS. 12 and 13 each are used for a different purpose and operate in different modes, as will be described here below. It should be understood that, for the purposes of FIGS. 12 and 13, the internal mechanism as shown in FIGS. 10 and 11 is incorporated therein. However, because FIGS. 12 and 13 show the tool from the outside, then the internal mechanisms cannot be seen.

In FIG. 12, the tool is used as a so-called panel saw. Panel saws are generally used for sawing large pieces of wood and the like in the form of blocks such as logs. In the present invention, it has been found desirable to be able to offer the user the facility of using the panel saw not only in its powered mode but also manually. That is, the user should be able to grip the handle (38) of the panel saw and use it as a conventional manually operated saw whether the blade is being driven by the motor (24) or not. To achieve this the saw needs to be lightweight but also it has been found that, when the saw is being driven by the motor (24), conventional reciprocating action will prevent manually using the tool with ease, because of the combination of the frequency of reciprocation of the saw blade (12) and the length of each reciprocal stroke.

Conventionally, it has been found that the frequency of reciprocation of the blade (12) has been around 3,000 strokes per minute. Additionally, the length of each reciprocal stroke has been in the region of 20 mm. The combination of this particular frequency and stroke length results in large vibrational forces being felt by the user. Additionally, this creates large interial forces which also need to be overcome in order to be able to use the saw manually. With a conventional panel saw, therefore, if the user wishes to use it manually rather than in its conventional powered mode, a degree of discomfort would be felt because the saw would be vibrating at a frequency which does not lend itself to holding the saw comfortably. Additionally, the amplitude of each reciprocal stroke of the blade (12) is so large that high inertial forces are felt by the user mean that to be able to pull and push the saw in a manual mode is not easily achievable.

It has been found that by reducing the length of each reciprocal stroke to preferably around 10 mm and concomitantly increasing the reciprocal stroke frequency to preferably around 6,500 strokes per minute, that this combination of lower stroke length and higher frequency results in less adverse vibrational and inertial forces being felt by the user. This then enables the panel saw of FIG. 12 to be used as a manual saw simply by holding the handle (38). Additionally, if the user requires a further grip on the body (36), a recess, formed as insert (40) is available for gripping by the other hand of the user (that is the hand which does not grip the handle (38)).

Although in the example described with reference to FIG. 12 the preferred frequency of oscillation has been given as 6,500 strokes per minute, the present invention has been found to operate effectively with a frequency of vibration between 3,000 and 10,000 strokes per minute. Similarly, although the preferred amplitude of each reciprocal stroke is given as 10 mm, it has been found that the present invention works effectively with a range of 5 to 15 mm.

Referring now also to FIG. 13, it can been seen that the same body (36) is used with a different saw blade (12'). Indeed, the saw blade (12') is that found on conventional "jigsaws". Jigsaws are tools which are used with relatively small saw blades and are used for cutting accurate shapes in a workpiece. Conventionally, jigsaws are held relative to the workpiece in a different attitude to panel saws. This can be seen by reference to the difference in attitude between FIGS. 12 and 13. In FIG. 13, the body (36) can be seen resting on a block (42) which represents a workpiece. In use of the jigsaw, the body (36) would be held on the block (42) in the attitude shown in FIG. 13.

It can be seen from FIG. 13 that the handle (38) is now positioned relative to the workpiece (42) such that the body (36) may easily be used as a jigsaw. In use of the jigsaw, a user exerts a force via the handle (38) in the direction of the large arrow marked "A". This is so that the blade (12') is driven also in the direction of the arrow "A" to cut through the workpiece.

It can be seen by comparing FIGS. 12 and 13, that the handle (38), although itself the same in both figures, it able to be used for exerting forces in a different direction depending on which mode of use (either the panel saw of FIG. 12 or the jigsaw of FIG. 13) the tools are put to.

The handle (38) is positioned adjacent a trigger (44) which trigger (44) is operable by user when the handle (38) is gripped.

It can be seen from both FIGS. 12 and 13, therefore, that the position of the handle (38) relative to the body (36) is such that the user may operate the saw in a plurality of positions relative to a workpiece. Thus, regardless of whether the tool is being used as a panel saw in FIG. 12 or a jigsaw in FIG. 13, the same handle is used for operating the saw. It will be appreciated by those skilled in the art, that this holds true whether the panel saw of FIG. 12 is being used as a powered saw by powering the motor (24) via an electricity supply cable (46), or whether it is being used manually.

In the examples shown, the trigger (44) is formed integrally with the handle (38). This need not necessarily be the case, and the trigger may be formed separately or indeed on another part of the body (36).

From FIGS. 12 and 13, therefore, it can be seen that the handle (38) is accessible from one of two sides, depending on whether the tool is to be used as a panel saw or a jigsaw. It is envisaged that the present invention is of scope to allow more than two sides of the handle (38) to be used depending on the purpose to which the tool is being put.

It can be seen from FIGS. 12 and 13, that the body (36) also includes a pivotable sole plate (48). The sole plate (48) is pivotable about pivot point (50). The pivot point (50) includes a means (now shown) for allowing the sole plate (48) to be held at any one of a desired position around the range of possible pivotable positions about the point (50). In the example of FIG. 12, the sole plate (48) is tucked underneath the body (36). In the example of FIG. 13, the sole plate (48) is pivoted through 270° so as to act as a guide sole plate for a conventional jigsaw. In this mode, the blade (12') passes through an aperture 47 in the sole plate (48) when used in its jigsaw mode. Also, the working surface 52 passes through the aperture 47 which is better shown in Applicant's U.S. Pat. No. D.455,624S, the specification and drawings of which are expressly incorporated by reference.

Those skilled in the art will appreciate that, conventionally, jigsaws use a sole plate (48) to act as a guide when cutting a workpiece. In the example of FIG. 13, although it cannot be seen from the drawing, the sole plate (48) includes visual indicia to allow the user to see exactly where the blade (12') will cut the workpiece when viewed from above the body (36).

It can be seen by comparing FIGS. 12 and 13, therefore, that the body (36) defines two working surfaces (52 and 54) dependent upon which mode the tool is being used. In the examples above, working surface (52) is used for the jigsaw mode of FIG. 13 and working surface (54) is used for the panel saw mode of FIG. 12.

It will be understood by those skilled in the art that the sole plate (48) may be positioned at any suitable angle relevant to the body (36) dependent upon the use to which the tool is being put.

By referring now particularly to FIG. 13 it can be seen that, when the tool is used as a jigsaw, a user may also grip the dimpled surface (56) in order to assist with guiding the tool during use. Alternatively, this surface (56) can be used to form cooling vents within the body of the saw.

What is claimed is:

1. A power saw including: a singular body unit and a motor housed within the singular body unit; the motor arranged to power a reciprocable shaft housed within the body adjacent said motor such that the motor and reciprocal shaft are within said singular body unit on which a blade for sawing may be mounted; a pivotable sole plate attached to the body and arranged to be held relative thereto in at least two positions such that in at least one position the sole plate acts as a guide for use of the power saw as a jigsaw with the blade for sawing passing through an aperture in the sole plate in use of the power saw as a jigsaw, wherein the body is shaped to define a recess within which the pivotable sole plate may sit when in at least one of the other of said two positions.

2. A power saw according to claim 1, wherein the body of the power saw defines two working surfaces either of which may, during use of the power saw, abut a workpiece, and wherein the pivotable sole plate may be pivoted to rest against either of these two surfaces.

3. A power saw according to claim 1, wherein the pivotable sole plate is lockable in any one of the at least two positions.

4. A power saw according to claim 2, wherein the pivotable sole plate is lockable in any one of the at least two positions.

5. A power saw including: a singular body unit and a motor housed within the singular body unit; the motor arranged to power a reciprocable shaft housed in said body and adjacent said motor such that the motor and reciprocal shaft are within said singular body unit on which a blade for sawing may be mounted; a pivotable sole plate attached at one of its ends to the body and arranged to be held relative thereto in at least two positions such that in at least one position the sole plate is in contact with a workpiece acting as a guide for use of the power saw as a jigsaw with the blade for sawing passing through an aperture in the sole plate in use of the power saw as a jigsaw, and in a second position the sole plate is pivoted about said end out of contact with the workpiece with the saw in a use position.

6. A power saw according to claim 5, wherein the body of the power saw defines two working surfaces either of which may, during use of the power saw, abut a workpiece, and wherein the pivotable sole plate may be pivoted to rest against either of these two surfaces.

7. A power saw according to claim 5, wherein the pivotable sole plate is lockable in any one of at least two positions.

8. A power saw according to claim 6, wherein the pivotable sole plate is lockable in any one of at least two positions.

9. A power saw comprising: a singular body unit and a motor housed within the singular body unit; the motor arranged to power a reciprocable shaft housed in said body adjacent said motor such that the motor and reciprocal shaft are within said singular body unit on which a blade for sawing may be mounted; a pivotable sole plate attached to the body and arranged to be held relative thereto in a at least two positions and in at least one position the sole plate acts as a guide for use of the power saw as a jigsaw and in which said at least one position a blade mounted on the reciprocable shaft is mounted to pass through an aperture in the sole plate; and wherein, in at least one further position, the sole plate is pivotably repositioned with respect to the at least one first position so that a blade mounted with respect to the reciprocable shaft does not pass therethrough in use of the power saw.

\* \* \* \* \*